(12) United States Patent
Akkarakaran et al.

(10) Patent No.: US 10,666,347 B2
(45) Date of Patent: May 26, 2020

(54) TECHNIQUES AND APPARATUSES FOR BEAM MANAGEMENT

(71) Applicant: QUALCOMM Incorporated, San Diego, CA (US)

(72) Inventors: Sony Akkarakaran, Poway, CA (US); Sumeeth Nagaraja, San Diego, CA (US); Tao Luo, San Diego, CA (US); Makesh Pravin John Wilson, San Diego, CA (US); Ajay Gupta, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 15/914,733

(22) Filed: Mar. 7, 2018

(65) Prior Publication Data

US 2018/0270689 A1     Sep. 20, 2018

Related U.S. Application Data

(60) Provisional application No. 62/471,203, filed on Mar. 14, 2017.

(51) Int. Cl.
*H04B 7/08*     (2006.01)
*H04W 24/10*    (2009.01)
(Continued)

(52) U.S. Cl.
CPC .......... *H04B 7/088* (2013.01); *H04B 7/0626* (2013.01); *H04B 7/0639* (2013.01);
(Continued)

(58) Field of Classification Search
None
See application file for complete search history.

(56) References Cited

U.S. PATENT DOCUMENTS 9,258,798 B2   2/2016  Li et al.
9,433,002 B2   8/2016  Yu et al.
(Continued)

FOREIGN PATENT DOCUMENTS

EP    2800286 A1   11/2014
EP    3200498 A1    8/2017
(Continued)

OTHER PUBLICATIONS

International Search Report and Written Opinion—PCT/US2018/021969—ISA/EPO—dated Jun. 12, 2018.

*Primary Examiner* — Donald L Mills
(74) *Attorney, Agent, or Firm* — Harrity & Harrity, LLP

(57) ABSTRACT

A user equipment (UE) may operate in a reception mode that includes a set of sleep cycles and a set of wake cycles. During a sleep cycle of the UE, a signal quality of an active beam carrying a control channel or a data channel may degrade. This may result in the UE failing to decode the control channel or the data channel during a subsequent wake cycle. In some aspects, the UE may perform a measurement of one or more beams, of a set of beams, prior to the wake cycle. In some aspects, the UE may identify a beam, of the one or more beams, to use for communication with a base station (BS). In this way, the UE reduces a delay in data transfer associated with performing beam recovery after failing to decode the control channel or data channel during the wake cycle.

30 Claims, 8 Drawing Sheets

(51) Int. Cl.
*H04W 52/02* (2009.01)
*H04B 7/06* (2006.01)
*H04W 76/25* (2018.01)
*H04W 76/28* (2018.01)
*H04B 7/26* (2006.01)

(52) U.S. Cl.
CPC .......... *H04B 7/0695* (2013.01); *H04W 24/10* (2013.01); *H04W 52/028* (2013.01); *H04W 52/0245* (2013.01); *H04W 52/0258* (2013.01); *H04W 76/25* (2018.02); H04B 7/2684 (2013.01); *H04W 76/28* (2018.02); Y02D 70/00 (2018.01); Y02D 70/10 (2018.01); Y02D 70/12 (2018.01); Y02D 70/126 (2018.01); Y02D 70/1242 (2018.01); Y02D 70/1262 (2018.01); Y02D 70/1264 (2018.01); Y02D 70/20 (2018.01); Y02D 70/21 (2018.01); Y02D 70/22 (2018.01); Y02D 70/24 (2018.01); Y02D 70/26 (2018.01); Y02D 70/444 (2018.01); Y02D 70/449 (2018.01)

(56) References Cited

U.S. PATENT DOCUMENTS

| | | | |
|---|---|---|---|
| 10,271,223 B2* | 4/2019 | Yu | H04B 7/0695 |
| 2002/0137538 A1* | 9/2002 | Chen | H04B 7/0491 |
| | | | 455/575.7 |
| 2005/0136929 A1* | 6/2005 | Iacono | H01Q 3/247 |
| | | | 455/436 |
| 2014/0198696 A1 | 7/2014 | Li et al. | |
| 2015/0078189 A1* | 3/2015 | Kwon | H04W 52/0216 |
| | | | 370/252 |
| 2017/0048863 A1* | 2/2017 | Tsai | H04B 7/0456 |
| 2017/0223667 A1 | 8/2017 | Yi et al. | |
| 2017/0251518 A1 | 8/2017 | Agiwal et al. | |
| 2017/0273058 A1* | 9/2017 | Agiwal | H04W 16/28 |
| 2017/0339675 A1* | 11/2017 | Liu | H04L 5/0051 |
| 2018/0041936 A1* | 2/2018 | Kim | H04W 4/70 |
| 2018/0269956 A1 | 9/2018 | Akkarakaran et al. | |
| 2019/0268939 A1* | 8/2019 | Yang | H04W 74/08 |

FOREIGN PATENT DOCUMENTS

| | | | |
|---|---|---|---|
| WO | WO-2016044994 A1 | 3/2016 | |
| WO | WO-2017139050 A1 | 8/2017 | |
| WO | WO-2018031327 A1 * | 2/2018 | .......... H04L 5/0053 |

* cited by examiner

TECHNIQUES AND APPARATUSES FOR BEAM MANAGEMENT

CROSS-REFERENCE TO RELATED APPLICATIONS UNDER 35 U.S.C. § 119

This application claims priority to U.S. Provisional Application 62/471,203 filed on Mar. 14, 2017 entitled "TECHNIQUES AND APPARATUSES FOR BEAM MANAGEMENT," which is incorporated by reference herein.

BACKGROUND

Field

Aspects of the present disclosure generally relate to wireless communication, and more particularly to techniques and apparatuses for beam management.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

A BS and a UE may communicate in a wireless communication system. Some wireless communication systems may experience a threshold level of path loss for beams of the wireless communication systems. For example, a BS may transmit a beam to a UE, which may be attenuated as a result of environmental conditions. As a result, the wireless communication system may be configured to use hybrid beamforming to enhance a link budget and/or a signal to noise ratio (SNR). Hybrid beamforming may include analog beamforming and digital beamforming, and may support multi-beam operation. In other words, the BS may configure a set of active beams for transmission to a UE, and may transmit the set of active beams.

The set of active beams may include one or more beam pairs to convey one or more data channels, one or more control channels, and/or the like. When the UE is operating in a connected discontinuous reception (CDRX) mode, the UE may periodically wake to monitor a control channel or a data channel being conveyed using an active beam of the set of active beams. However, a signal quality of the active beam may degrade during a sleep cycle of the UE and prior to a wake cycle of the UE. For example, the signal quality may be reduced as a result of a signal fade condition, a signal blockage condition, or the UE being moved to another location associated with poor signal quality (e.g., a location that is farther from the BS than an initial location of the UE). The degradation in signal quality may result in a delay by the UE in a data transfer for the UE using network resources allocated for use by the UE.

SUMMARY

Aspects, described herein, provide a mechanism by which a UE may utilize cell specific resources to permit the UE to select a beam, of a plurality of beams, for communication with the BS, such as to receive and/or decode a data channel or a control channel. In this case, the UE may, prior to a wake cycle, perform one or more measurements of one or more reference signals transmitted by the BS. Based at least in part on the one or more measurements, the UE may identify a beam for communication with the BS, such as for receiving and/or decoding a control channel or a data channel. Additionally, or alternatively, the UE may preemptively transmit information to the BS prior to the wake cycle of the UE to cause the BS to transmit information to permit the UE to recover a beam for a subsequent wake cycle. In this way, the BS may provide, and the UE may utilize, a beam associated with a threshold level of signal quality to decode a control channel or a data channel when operating in a connected discontinuous reception mode.

In an aspect of the disclosure, methods, UEs, apparatuses, and computer program products are provided.

In some aspects, a method may include performing, by a UE, one or more measurements prior to a wake cycle associated with a reception mode of the UE. The UE may be configured to use two or more beams from a plurality of beams for communication. The method may include identifying, by the UE and based at least in part on the one or more measurements, a beam from the plurality of beams for communication with a base station. The beam may be selected to be used to receive a control channel or a data channel.

In some aspects, a UE may include a memory and at least one processor coupled to the memory. The memory and the at least one processor may be configured to perform one or more measurements prior to a wake cycle associated with a reception mode of the UE. The UE may be configured to use two or more beams from a plurality of beams for communication. The memory and the at least one processor may be configured to identify, based at least in part on the one or more measurements, a beam from the plurality of beams for communication with a base station. The beam may be selected to be used to receive a control channel or a data channel.

In some aspects, an apparatus may include means for performing one or more measurements prior to a wake cycle associated with a reception mode of a UE. The UE may be configured to use two or more beams from a plurality of beams for communication. The apparatus may include means for identifying, based at least in part on the one or more measurements, a beam from the plurality of beams for communication with a base station. The beam may be selected to be used to receive a control channel or a data channel.

In some aspects, the computer program product may include a non-transitory computer-readable medium storing one or more instructions. The one or more instructions, when executed by one or more processors of a UE, may cause the one or more processors to perform one or more measurements prior to a wake cycle associated with a reception mode of a UE. The UE may be configured to use two or more beams from a plurality of beams for communication. The one or more instructions, when executed by the one or more processors of the UE, may cause the one or more processors to identify, based at least in part on the one or more measurements, a beam from the plurality of beams for communication with a base station. The beam may be selected to be used to receive a control channel or a data channel.

In some aspects, a method may include determining, by the UE, an occurrence of a triggering event, wherein the triggering event is associated with an identification of a beam of a plurality of beams. The method may include performing, by the UE, measurements of reference signals on different beams, of the plurality of beams, prior to a wake cycle associated with a reception mode of the UE. The method may include identifying, by the UE, the beam based at least in part on the measurements. The method may include receiving, by the UE, a control channel or a data channel using the beam after identifying the beam.

In some aspects, a UE may include a memory and one or more processors operatively coupled to the memory. The memory and the one or more processors may be configured to determine an occurrence of a triggering event, wherein the triggering event is associated with an identification of a beam of a plurality of beams. The memory and the one or more processors may be configured to perform measurements of reference signals on different beams, of the plurality of beams, prior to a wake cycle associated with a reception mode of the UE. The memory and the one or more processors may be configured to identify the beam based at least in part on the measurements. The memory and the one or more processors may be configured to receive a control channel or a data channel using the beam after identifying the beam.

In some aspects, the apparatus may include means for determining an occurrence of a triggering event, wherein the triggering event is associated with an identification of a beam of a plurality of beams. The apparatus may include means for performing measurements of reference signals on different beams, of the plurality of beams, prior to a wake cycle associated with a reception mode of the UE. The apparatus may include means for identifying the beam based at least in part on the measurements. The apparatus may include means for receiving a control channel or a data channel using the beam after identifying the beam.

In some aspects, the computer program product may include a non-transitory computer-readable medium storing one or more instructions. The one or more instructions, when executed by one or more processors of a UE, may cause the one or more processors to determine an occurrence of a triggering event, wherein the triggering event is associated with an identification of a beam of a plurality of beams. The one or more instructions, when executed by the one or more processors of the UE, may cause the one or more processors to perform measurements of reference signals on different beams, of the plurality of beams, prior to a wake cycle associated with a reception mode of the UE. The one or more instructions, when executed by the one or more processors of the UE, may cause the one or more processors to identify the beam based at least in part on the measurements. The one or more instructions, when executed by the one or more processors of the UE, may cause the one or more processors to receive, by the UE, a control channel or a data channel using the beam after identifying the beam.

Aspects generally include a method, apparatus, system, computer program product, non-transitory computer-readable medium, UE, base station, wireless communication device, access point, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
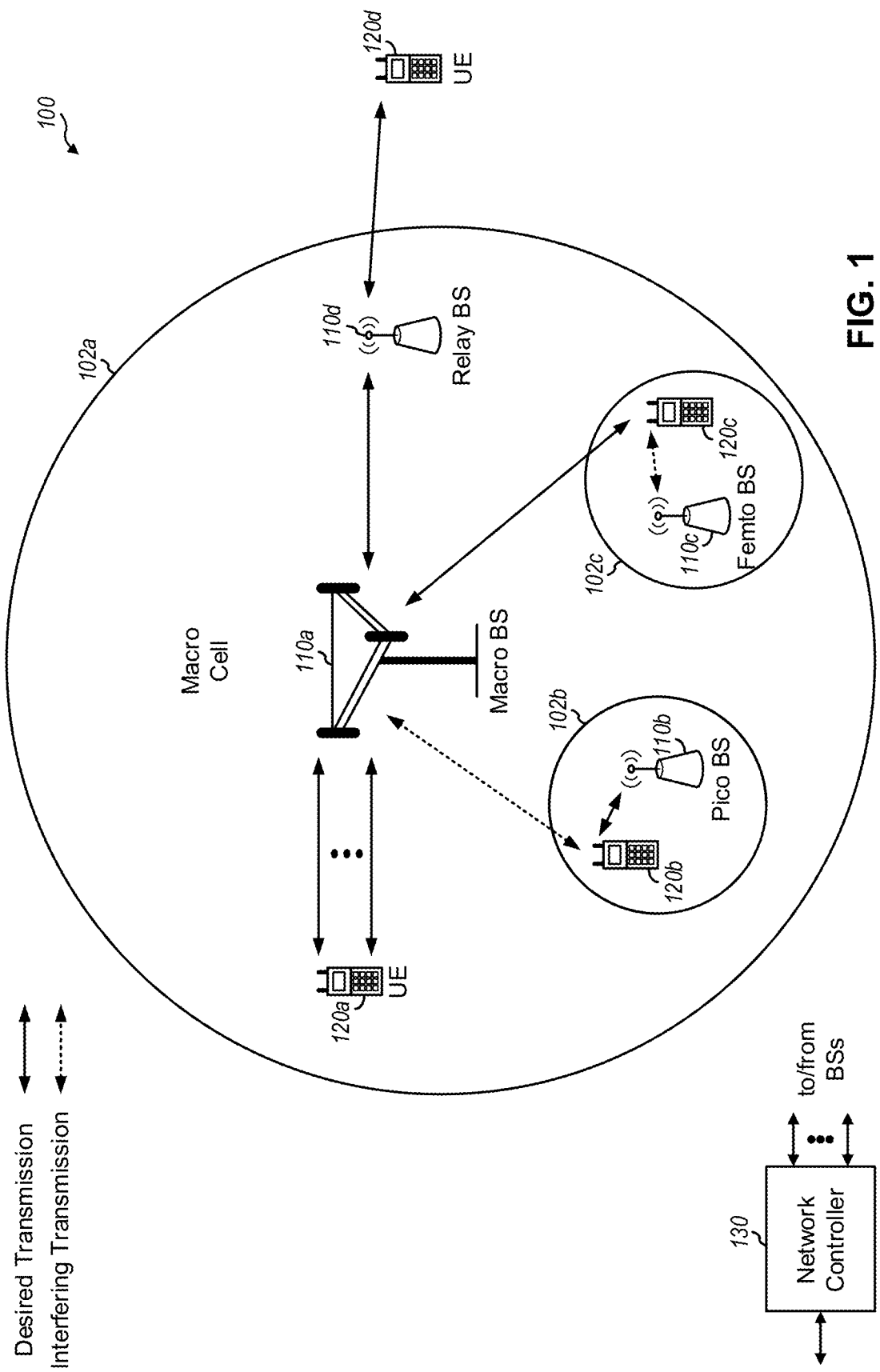
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a 5G BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G or a new radio (NR) network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS. In some aspects, a UE 120 (e.g., UE 120a) may communicate with a BS 110 (e.g., BS 110a) using multiple beams. For example, BS 110a may utilize hybrid beamforming to provide a plurality of beams to UE 120a. UE 120a may select a first set of beams, of the plurality of beams, to receive and/or decode a channel, such as a control channel or a data channel. In some aspects, UE 120a may perform one or more measurements of the plurality of beams before a wake cycle of UE 120a. For example, UE 120a may perform one or more measurements of a plurality of reference signals provided via the plurality of beams, and may identify a second set of beams to receive and/or decode the channel (e.g., the same set of beams, a different set of beams, a combination of the same and different beams, etc.). In this case, UE 120a may receive the channel via the second set of beams, and may decode the channel based at least in part on receiving the channel.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station)

allocates resources for communication among some or all devices and equipment within the scheduling entity's service area or cell. For example, the scheduling entity may schedule a subset of available resources for a reference signal, an uplink transmission, a beam recovery operation (e.g., transmitting a measurement report, receiving information identifying a beam to select, transmitting a request for a reference signal, etc.), and/or the like. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
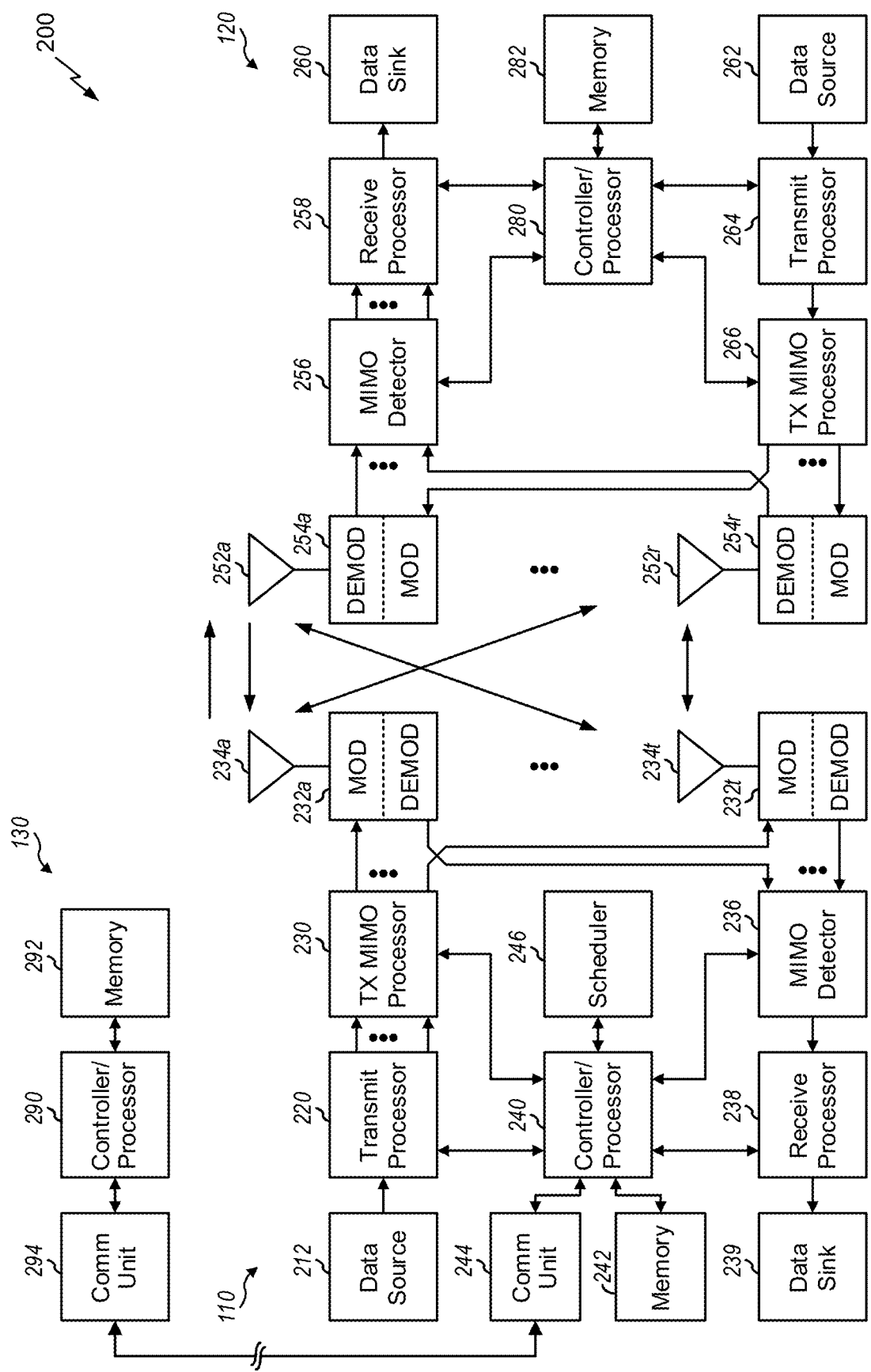
FIG. 2 is a diagram illustrating an example of a base station in communication with a user equipment (UE) in a wireless communication network.

FIG. 2 shows a block diagram 200 of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). The reference signals may be received by UE 120, and may be used to identify a beam, of a plurality of beams, for receiving a control channel or a data channel. In some aspects, a reference signal may be transmitted using a pre-scheduled resource allocation. In some aspects, a reference signal may be transmitted based at least in part on BS 110 receiving a request for a reference signal. A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. In some aspects, UE 120 may be configured to receive a plurality of hybrid beamformed beams from one or more BSs 110. For example, based at least in part on identifying a beam for communication with BS 110, UE 120 may receive a control channel or a data channel using the beam. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at BS 110 and UE 120, respectively, to identify a beam for communication between BS 110 and UE 120. For example, controller/processor 240 and/or other processors and modules at BS 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

While aspects of the examples described herein may be associated with LTE technologies, aspects of the present disclosure may be applicable with other wireless communication systems, such as 5G technologies.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, hybrid beamforming, and/or mission critical targeting ultra reliable low latency communications (URLLC) service.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

Figure 3:
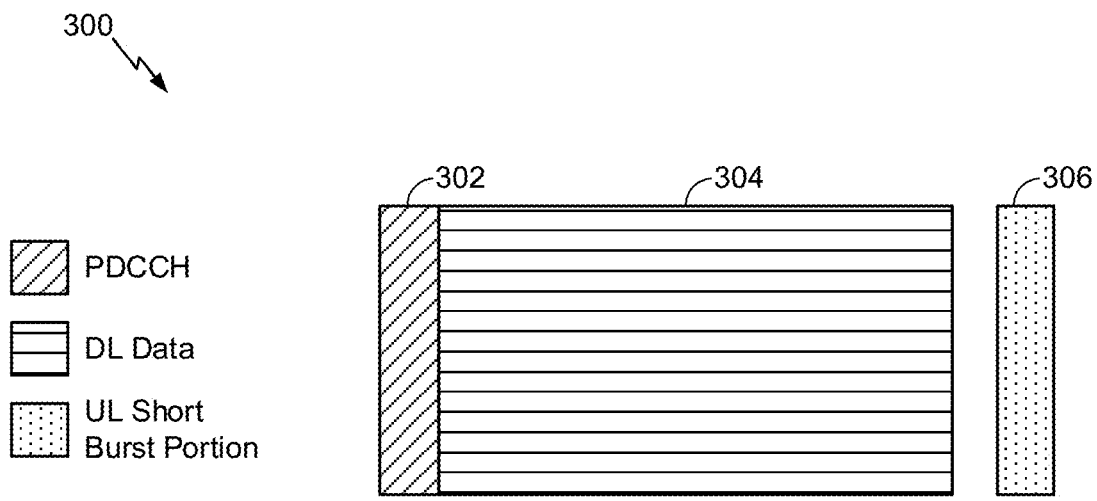
FIG. 3 is a diagram illustrating an example of a downlink (DL)-centric wireless communication structure.

FIG. 3 is a diagram 300 showing an example of a DL-centric subframe or wireless communication structure. The DL-centric subframe may include a control portion 302. The control portion 302 may exist in the initial or beginning portion of the DL-centric subframe. The control portion 302 may include various scheduling information and/or control information corresponding to various portions of the DL-centric subframe. In some configurations, the control portion 302 may be a physical DL control channel (PDCCH), as indicated in FIG. 3. In a connected discontinuous reception (CDRX) mode, a UE (e.g., UE 120) may periodically wake during an 'ON' period (e.g., a wake cycle) to monitor the PDCCH. A discontinuous reception cycle time may indicate a quantity of subframes of the 'ON' period, such as up to 2560 subframes. In some cases, during a period when the UE is in a sleep cycle, a signal quality associated with the PDCCH may degrade. In some aspects, the UE may perform one or more measurements of one or more reference signals prior to a wake cycle, and may identify a beam that is to be used to transmit information to and/or receive information from a BS (e.g., BS 110). In this case, the UE may use the beam to receive the PDCCH or another channel (e.g., another control channel or a data channel) based at least in part on identifying the beam.

The DL-centric subframe may also include a DL data portion 304. The DL data portion 304 may sometimes be referred to as the payload of the DL-centric subframe. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PDSCH).

The DL-centric subframe may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric subframe. For example, the UL short burst portion 306 may include feedback information corresponding to the control portion 302 and/or the data portion 304. Non-limiting examples of information that may be included in the UL short burst portion 306 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. In some aspects, these types of information may be included by a UE (e.g., UE 120) in a transmission to convey a measurement report to a BS (e.g., BS 110). The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 3 is provided merely as an example. Other examples are possible and may differ from what was described with regard to FIG. 3.

Figure 4:
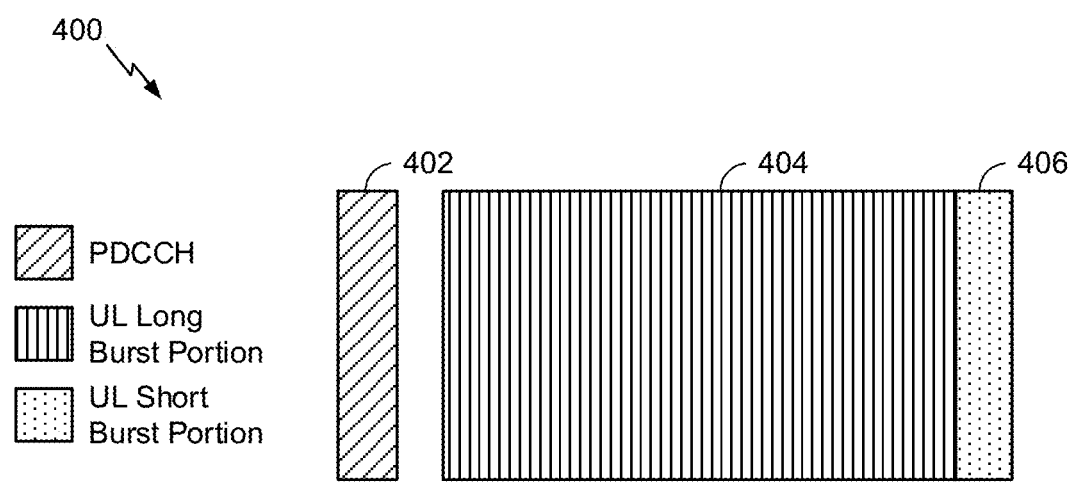
FIG. 4 is a diagram illustrating an example of an uplink (UL)-centric wireless communication structure.

FIG. 4 is a diagram 400 showing an example of an UL-centric subframe or wireless communication structure. The UL-centric subframe may include a control portion 402. The control portion 402 may exist in the initial or beginning portion of the UL-centric subframe. The control portion 402 in FIG. 4 may be similar to the control portion 302 described above with reference to FIG. 3. In some configurations, the control portion 402 may be a physical DL control channel (PDCCH).

The UL-centric subframe may also include an UL long burst portion 404. The UL long burst portion 404 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 406. The UL short burst portion 406 in FIG. 4 may be similar to the UL short burst portion 306 described above with reference to FIG. 3, and may include any of the information described above in connection with FIG. 3. The foregoing is merely one example of an UL-centric wireless communication structure and alternative structures having similar features may exist without necessarily deviating from the aspects described herein.

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 4 is provided merely as an example. Other examples are possible and may differ from what was described with regard to FIG. 4.

Figure 5:
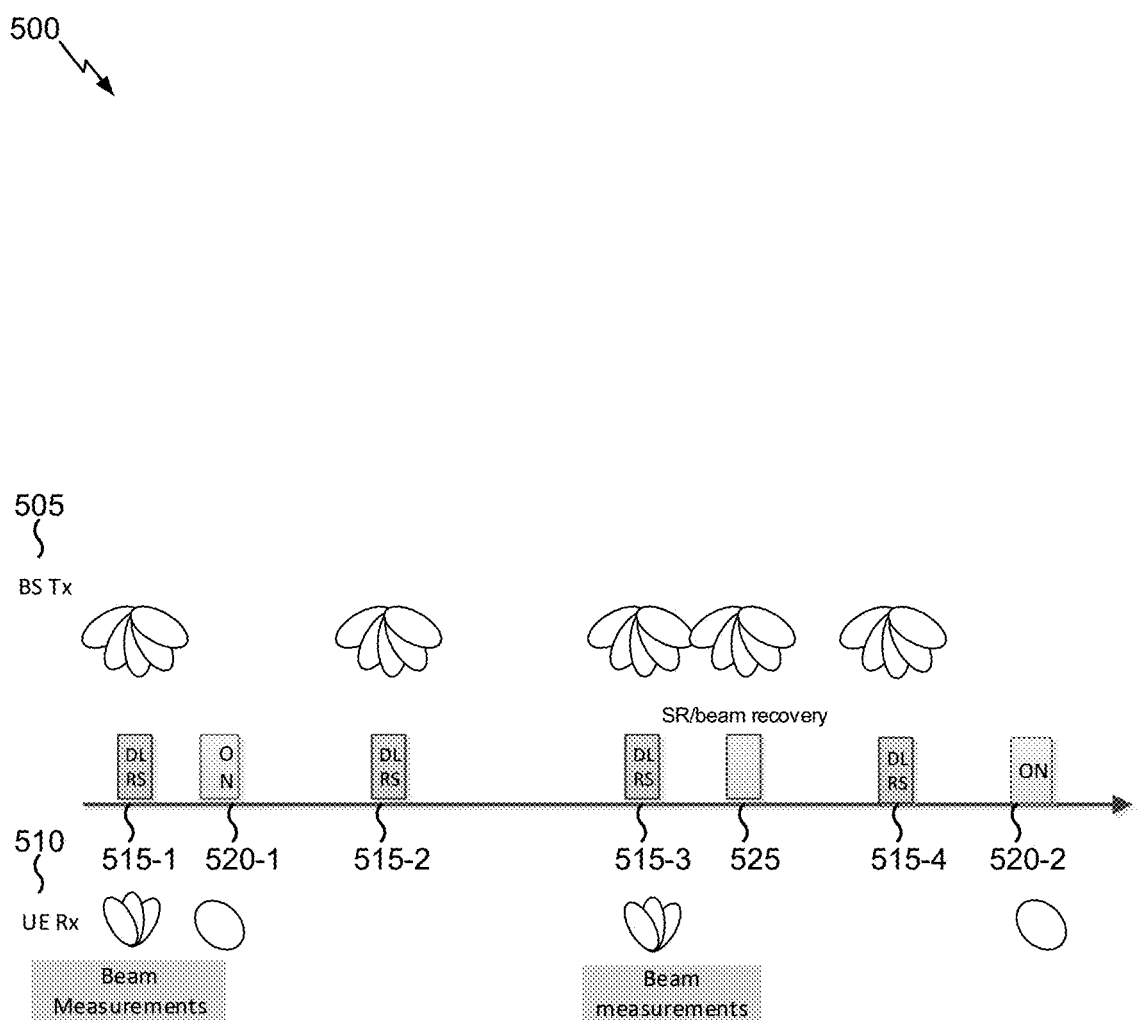
FIG. 5 is a diagram illustrating an example of identifying a beam to communicate with a base station.

FIG. 5 is a diagram illustrating an example 500 of identifying a beam to communicate with a base station. As shown in FIG. 5, example 500 shows transmission and reception of information in a connected discontinuous reception (CDRX) mode, which includes a set of transmissions 505 from a BS (e.g., BS 110) and corresponding receptions 510 by a UE (e.g., UE 120).

At 515-1, prior to a wake cycle of the UE, the BS transmits a plurality of beams, and the UE performs a measurement of at least one of the plurality of beams. For example, the UE may measure a beam to determine that a signal quality of the beam satisfies a threshold. In some aspects, the plurality of beams may include a synchronization signal (e.g., a new radio synchronization signal (NR-SS) that corresponds to a cell that includes the UE), a channel state information reference signal (CSI-RS) (e.g., a CSI-RS that corresponds to the UE or to a cell that includes the UE), a combination of a synchronization signal and a CSI-RS, and/or the like. In some aspects, the one or more measurements are configured by the BS. For example, prior to transmitting the plurality of beams or concurrent with transmitting the plurality of beams, the BS may provide information identifying a quantity of measurements that the UE is to perform (e.g., information identifying the quantity, information identifying a minimum or maximum for the quantity, etc.). In some aspects, the UE may select a beam to use to receive and/or decode a control channel or a data channel based at least in part on the one or more measurements. In some aspects, the UE may wake from a sleep cycle to perform a measurement. For example, the UE may wake from the sleep cycle before an 'ON' period associated with a wake cycle to preemptively identify a beam for use to receive and/or decode a control channel or a data channel during the 'ON' period.

At 520-1, the UE operates in the 'ON' period. For example, based at least in part on the one or more measurements, the UE may identify a beam that is to be used for communication with the BS (e.g., to transmit information to the BS or receive information from the BS, such as using a PDSCH, a PDCCH, a PUSCH, a PUCCH, and/or the like). In this case, the UE may receive a beam (e.g., from the BS) based at least in part on identifying the beam. For example, the UE may select a particular channel, frequency, time, etc. based at least in part on identifying the beam, and may receive the beam using the particular channel, frequency, time, etc. In this way, based at least in part on performing the one or more measurements prior to the 'ON' period, the UE reduces a likelihood that the UE is unable to receive information in a CDRX mode relative to another technique that does not include preemptive measurements, thereby reducing a delay for data transfer associated with performing signal recovery after a failure to receive information during an 'ON' period.

At 515-2 and 515-3, the BS transmits beams. For example, the BS may transmit a set of CSI-RSs for the UE to perform one or more measurements. As shown, the UE performs one or more measurements of beams transmitted by the BS. Based at least in part on the one or more measurements, the UE may determine to perform a beam recovery procedure or transmit a scheduling request using a beam recovery or scheduling request resource allocation. In some aspects, the UE may determine to perform the beam recovery procedure or transmit the scheduling request based at least in part on detecting a condition satisfying an occurrence of a triggering event. For example, prior to a wake cycle, the UE may receive information from the BS associated with configuring a set of occurrences of triggering events (e.g., RRC connected state configuration information). In this case, the triggering events may relate to whether the UE is to transmit a measurement report to the BS to identify the one or more measurements, whether the UE is to perform a beam switch, or the like. Based at least in part on the configured triggering events, some measurement reports may be suppressed based at least in part on a suppression criterion (e.g., a threshold relating to a measurement). For example, a filtering criterion or a hysteresis criterion may be configured for the UE by the BS to reduce a quantity of beam switches that occur, thereby reducing a utilization of power resources of the UE.

At 525, the UE uses a control resource (e.g., an uplink control resource), such as a beam recovery resource (e.g., a network resource allocated to perform beam recovery), a scheduling request resource (e.g., a network resource allocated to transmit a scheduling request), an uplink control channel resource (e.g., a RRC configured PUCCH resource), and/or the like to provide a measurement report of one or more measurements performed on one or more beams. Additionally, or alternatively, the UE may use the beam recovery resource, the scheduling request resource, the PUCCH resource, and/or the like to transmit a scheduling request (e.g., for a grant), to transmit a request for a reference signal (e.g., to perform additional measurements), and/or the like. In some aspects, the UE may provide other information with the measurement report (e.g., using a single beam common to the other information and the measurement report), such as an indicator of a grant, an acknowledgement message (e.g., an ACK or NACK message), uplink control information, a grantless uplink transmission, and/or the like. In some aspects, the UE may provide multiple beams to convey the measurement report and/or other information with the measurement report. In this way, the UE may ensure redundancy to reduce a likelihood that the BS fails to receive the measurement report relative to providing a single transmission.

In some aspects, the beam recovery resource, the scheduling request resource, the PUCCH resource, and/or the like may be allocated prior to an 'ON' period to permit the UE to preemptively perform beam recovery (e.g., trigger a beam switch) before the 'ON' period, thereby improving a likelihood that the UE successfully receives and decodes a control channel or a data channel during the 'ON' period. In some aspects, the UE may transmit an indication of a beam to which the UE is to switch. For example, the UE may transmit a beam identifier with the measurement report, or may transmit the measurement report to the BS to cause the BS to identify the beam to which the UE is to switch based at least in part on information included in the measurement report (e.g., a set of signal quality measurements associated with a set of beams). Based at least in part on the BS receiving the measurement report, the BS and the UE may perform a beam switch to use another beam to communicate with the BS. In some aspects, the BS may transmit information to the UE based at least in part on performing a beam switch. For example, the BS may allocate resources to transmit network traffic to the UE before a next scheduled 'ON' period occurs. In this case, the UE may exit a CDRX mode and transfer to an active mode to receive the network traffic. Additionally, or alternatively, the BS may suppress the next scheduled 'ON' period based at least in part on determining a lack of network traffic to transmit to the UE.

At 515-4, the BS provides a set of beams for the UE to perform one or more measurements, and the UE suppresses performing the one or more measurements. For example, based at least in part on performing a beam switch, the UE may determine not to perform the one or more measurements. In this way, the UE reduces a utilization of power resources relative to performing measurements of transmitted beams each occurrence of a beam transmission.

At 520-2, the UE operates in an 'ON' period. For example, based at least in part on performing a beam switch, the UE communicates with the BS using an identified beam. In this case, the UE may use the identified beam to monitor a PDCCH. Additionally, or alternatively, the UE and the BS may use the identified beam to transmit and/or receive a channel, such as a PDSCH, a PDCCH, a PUSCH, a PUCCH, and/or the like.

As indicated above, FIG. 5 is provided as an example. Other examples are possible and may differ from what was described with respect to FIG. 5.

Figure 6:
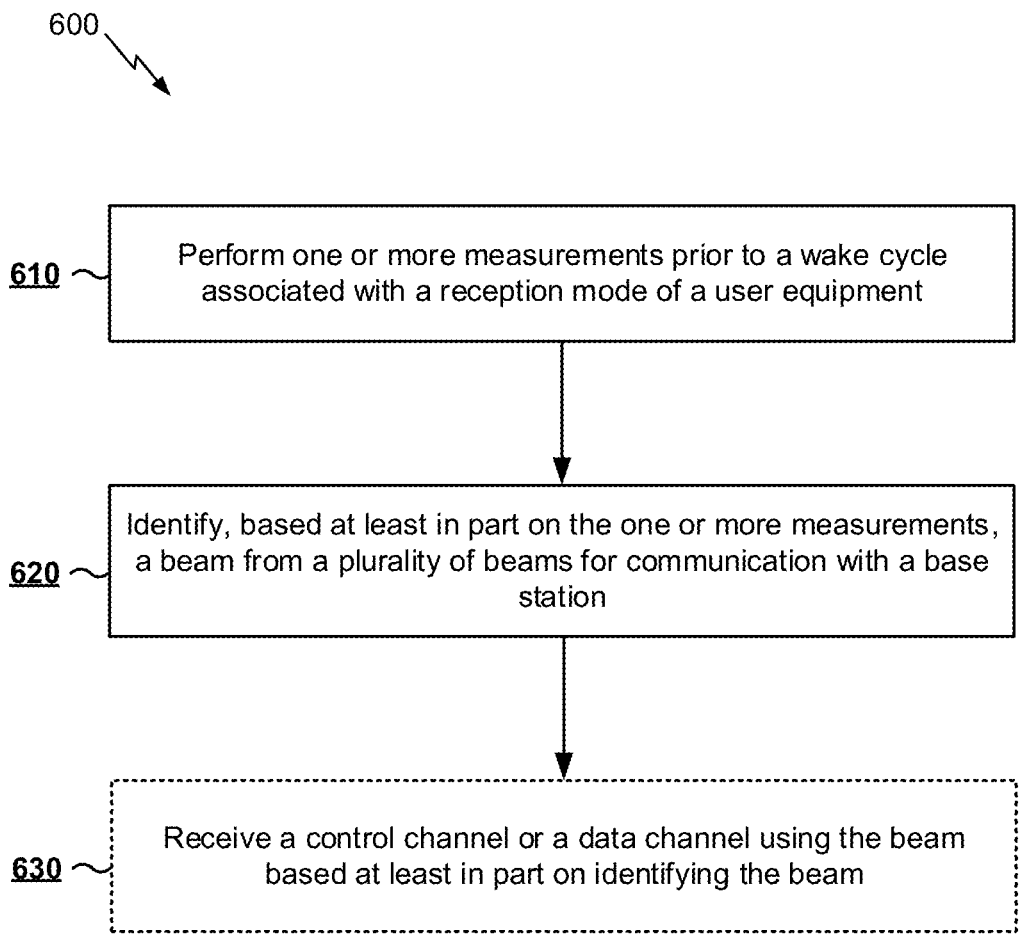
FIG. 6 is a flow chart of a method of wireless communication.

FIG. 6 is a flow chart of a process 600 of wireless communication. The method may be performed by a user equipment (e.g., the UE 120, the apparatus 802/802', and/or the like).

At 610, the user equipment may perform one or more measurements prior to a wake cycle associated with a reception mode of a user equipment. For example, the user equipment may perform the one or more measurements prior to the wake cycle associated with the reception mode of the user equipment. In some aspects, the user equipment is configured to use two or more beams from a plurality of beams for communication. In some aspects, the one or more measurements are performed on one or more reference signals, and the one or more reference signals may include an NR-SS signal, a CSI-RS signal, a combination thereof, and/or the like. In some aspects, at least one of the one or more reference signals is the CSI-RS, and the CSI-RS corresponds to the user equipment or a cell that includes the user equipment. In some aspects, the one or more measurements are performed using at least one of a plurality of reference signals.

In some aspects, a quantity of the one or more measurements is determined based at least in part on received information. In some aspects, the received information identifies the quantity of the one or measurements, a minimum quantity for the quantity of the one or more measurements, a maximum quantity for the quantity of the one or more measurements, and/or the like. In some aspects, the one or more measurements are performed on one or more downlink reference signals provided by the base station to enable the one or more measurements. In some aspects, the user equipment is configured to awaken from a sleep cycle to perform the one or more measurements prior to the wake cycle. In some aspects, one or more reference signals, of a plurality of reference signals, are selected for the one or more measurements based at least in part on a periodicity of the one or more reference signals. In some aspects, the one or more measurements are performed prior to a scheduling request or a beam recovery request associated with identifying the beam.

In some aspects, a measurement report regarding the one or more measurements and other information are provided via a common beam, and the other information includes an indicator relating to a grant, an acknowledgement message, uplink control information, a grantless uplink transmission, and/or the like. In some aspects, the common beam is a plurality of common beams, and each of the plurality of common beams may convey the one or more measurements and the other information.

At 620, the user equipment may identify, based at least in part on the one or more measurements, a beam from a plurality of beams for communication with a base station. For example, the user equipment may identify, based at least in part on the one or more measurements, the beam from the plurality of beams for communication with the base station. In some aspects, the beam is selected to be used to receive a control channel or a data channel. In some aspects, a scheduling request is transmitted to identify the beam using a network resource allocated for beam recovery. In some aspects, a control signal is transmitted on a control resource to identify the beam using a network resource allocated for beam recovery. In some aspects, the control resource is an uplink control resource, such as a scheduling request resource, a beam failure recovery request (BFRQ) resource, a physical uplink control channel resource, and/or the like. In some aspects, a network resource allocated for beam recovery to identify the beam is used to send a measurement report, send a request for a reference signal, and/or the like.

In some aspects, the user equipment is to identify the beam to avoid a beam switch to another beam, of the plurality of beams, based at least in part on an occurrence of a triggering event. In some aspects, the occurrence of a triggering event relates to a radio resource control (RRC) state for the reception mode. In some aspects, the occurrence of a triggering event relates to a filtering criterion, a hysteresis criterion, and/or the like. In some aspects, reporting of a condition, satisfying the occurrence of a triggering event, to identify the beam, is suppressed based at least in part on a suppression criterion. In some aspects, a reference signal for the one or more measurements is quasi co-located with at least one of the plurality of beams, and the occurrence of a triggering event relates to a threshold power level for the at least one of the plurality of beams.

In some aspects, the occurrence of a triggering event causes a measurement report to be provided using a control resource to identify the beam. In some aspects, the control resource is an uplink control resource, such as a scheduling request, a beam failure recovery request, a physical uplink control channel (PUCCH) resource, and/or the like. In some aspects, the measurement report identifies a subset of the plurality of beams. In some aspects, the measurement report identifies the beam, and the measurement report is to cause a switch to using the beam. In some aspects, a beam switch to the beam from another beam, of the plurality of beams, is performed to recover the control channel or the data channel.

At 630, in some aspects, the user equipment may receive a control channel or a data channel using the beam based at least in part on identifying the beam. For example, the user equipment may receive a PDSCH, a PDCCH, a PUSCH, a PUCCH, and/or the like based at least in part on identifying the beam. In some aspects, network traffic is received based at least in part on recovering the control channel or the data channel using the measurement report, the network traffic is received before a next scheduled active period of the reception mode, and the network traffic is received based at least in part on a transfer from the reception mode to another reception mode. In some aspects, a next active period of the reception mode is suppressed based at least in part on the measurement report.

Process 600 may include additional aspects, such as any single aspect or any combination of aspects described above.

Although FIG. 6 shows example blocks of a method of wireless communication, in some aspects, the method may include additional blocks, fewer blocks, different blocks, or differently arranged blocks than those shown in FIG. 6. Additionally, or alternatively, two or more blocks shown in FIG. 6 may be performed in parallel.

Figure 7:
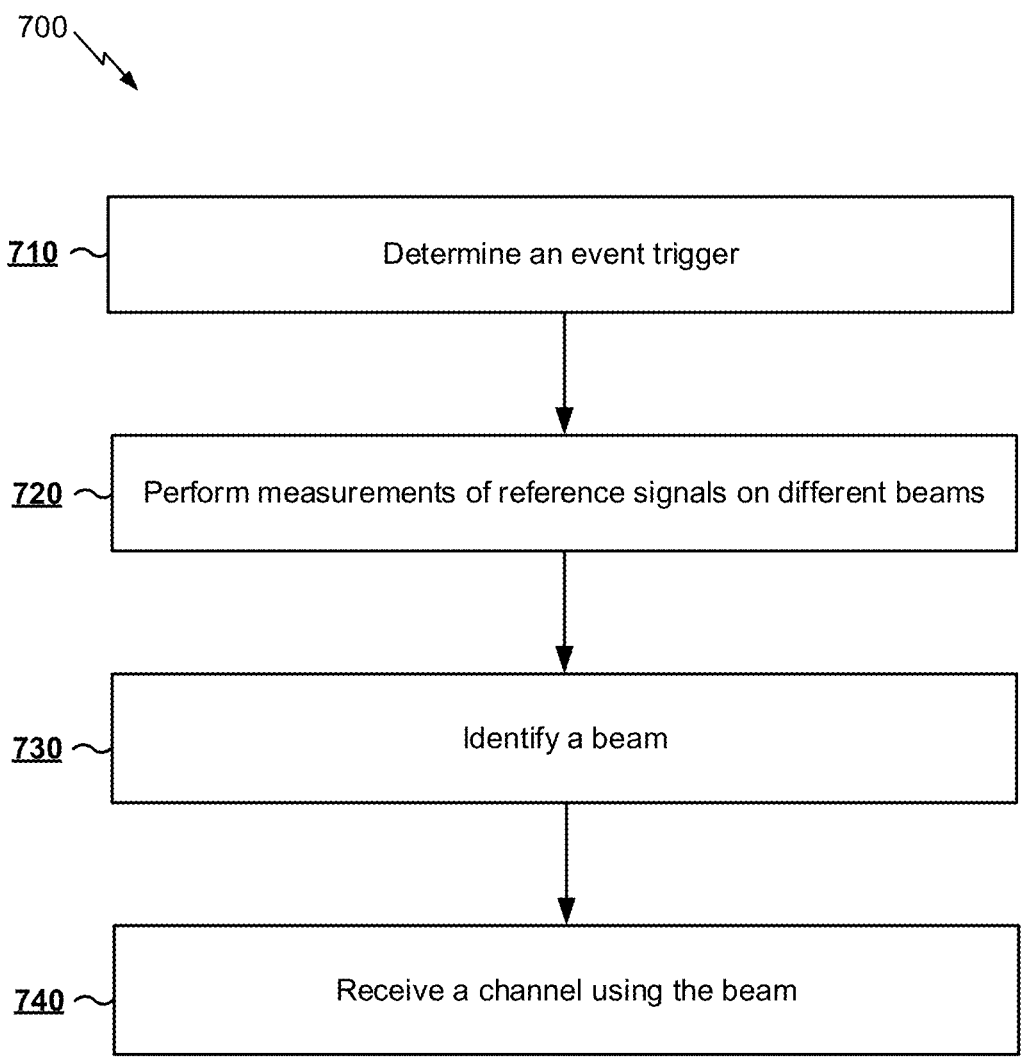
FIG. 7 is a flow chart of a method of wireless communication.

FIG. 7 is a flow chart of a process 700 of wireless communication. The method may be performed by a user equipment (e.g., the UE 120, the apparatus 802/802', and/or the like).

At 710, the user equipment may determine an occurrence of a triggering event. For example, the user equipment may determine an occurrence of a triggering event, wherein the triggering event is associated with an identification of a beam of a plurality of beams.

In some aspects, the user equipment is configured to awaken from a sleep cycle to perform measurements prior to the wake cycle. In some aspects, the triggering event corresponds to a reception mode state. In some aspects, the triggering event corresponds to a criterion associated with a battery of the user equipment or a quantity of beam switches, and the criterion is a filtering criterion, a threshold criterion, and/or the like. In some aspects, the user equipment is configured to suppress a condition report when the triggering event occurs.

In some aspects, the occurrence of the triggering event causes the user equipment to include a measurement report in an uplink control resource to identify the beam. In some aspects, the measurement report identifies a subset of the plurality of beams. In some aspects, the user equipment uses the beam after transmission of the measurement report identifies the beam. In some aspects, the user equipment receives network traffic before a next scheduled active period of the reception mode and in another reception mode. In some aspects, a next active period of the reception mode is suppressed based at least in part on the measurement report. In some aspects, the measurement report regarding the measurements and other information are to be provided via a same beam, and the other information includes an indicator relating to a grant, an acknowledgement message, uplink control information, a grantless uplink transmission, and/or the like. In some aspects, a PUCCH or PUSCH may be used to provide the other information. For example, a PUCCH resource or a PUSCH resource may be semi-statically scheduled to use for providing the other information.

At 720, the user equipment may perform measurements of reference signals on different beams. For example, the user equipment may perform measurements of reference signals on different beams, of the plurality of beams, prior to a wake cycle associated with a reception mode of the UE.

In some aspects, the reference signals are transmitted by a base station and include a synchronization signal, a CSI-RS, a combination thereof, and/or the like. In some aspects, at least one of the reference signals is the CSI-RS, and the CSI-RS corresponds to the user equipment or a cell that includes the user equipment. In some aspects, received information identifies a quantity of the measurements, a minimum quantity of the measurements, a maximum quantity of the measurements, and/or the like.

In some aspects, the reference signals are selected for the measurements based at least in part on a periodicity of the reference signals. In some aspects, the measurements are performed prior to a scheduling request or a beam recovery request associated with identifying the beam. In some aspects, a reference signal, of the reference signals, is quasi co-located with at least one of the different beams, and the triggering event relates to a threshold power level for the at least one of the different beams.

At 730, the user equipment may identify a beam. For example, the user equipment may the beam based at least in part on the measurements.

In some aspects, the UE is configured to transmit a communication on a scheduling resource, to a base station, that indicates the beam using a network resource allocated for beam recovery. In some aspects, a network resource allocated for beam recovery is to be used to send a measurement report, receive an indication of the beam, send a request for a reference signal of the reference signals, and/or the like. In some aspects, the user equipment is configured to identify the beam to avoid a beam switch to another beam of the plurality of beams.

At 740, the user equipment may receive a channel using the beam. For example, the user equipment may receive a control channel or a data channel using the beam after identifying the beam.

In some aspects, network traffic is received based at least in part on recovering the control channel or the data channel using the measurement report, and the network traffic is received before a next scheduled active period of the reception mode, and the network traffic is received based at least in part on a transfer from the reception mode to another reception mode. In some aspects, a beam switch to the beam from another beam, of the plurality of beams, is performed to recover the control channel or the data channel.

Process 700 may include additional aspects, such as any single aspect or any combination of aspects described above.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
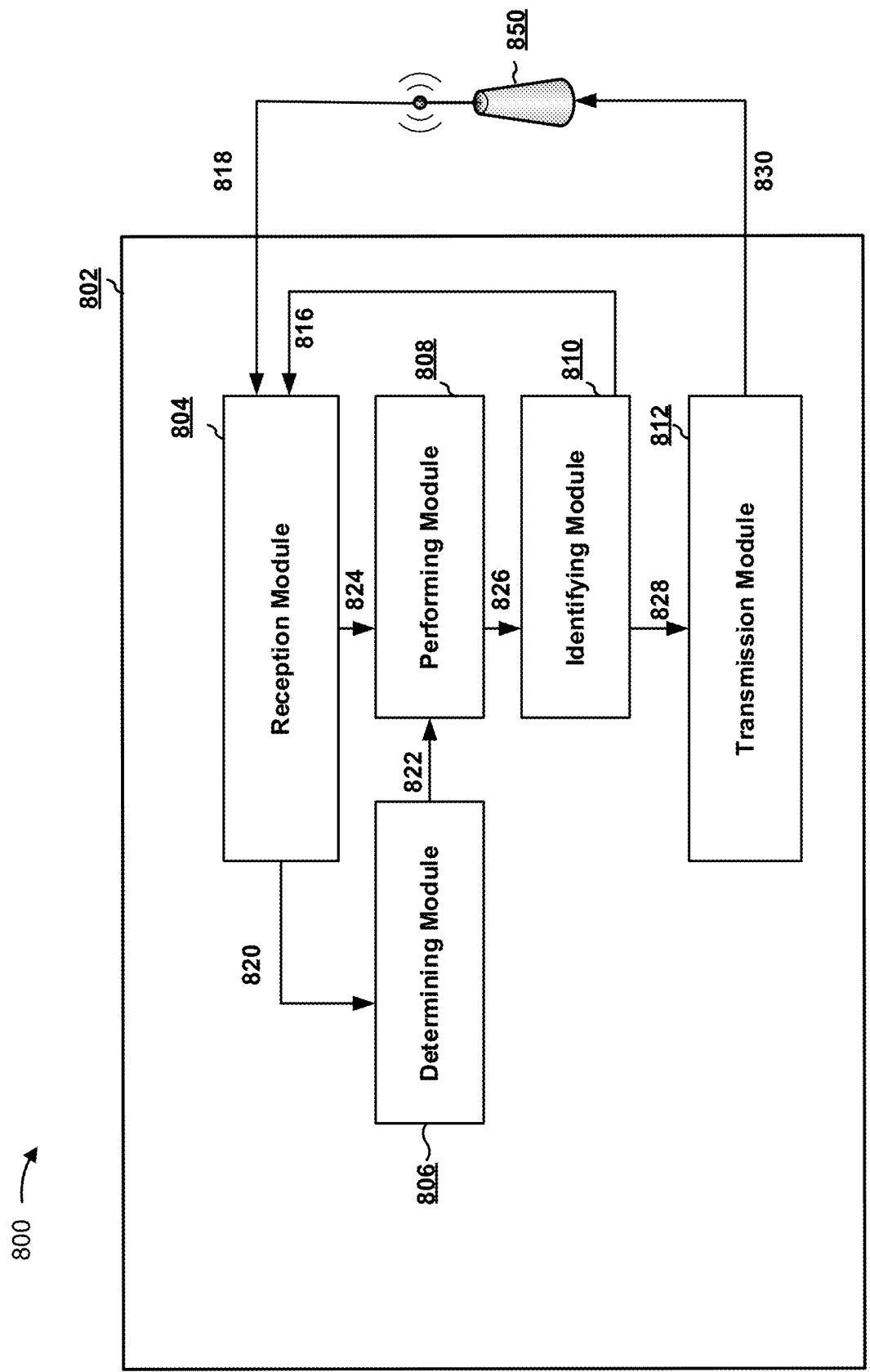
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a UE. In some aspects, the apparatus 802 includes a reception module 804, a determining module 806, a performing module 808, an identifying module 810, and/or a transmission module 812.

The reception module 804 may include, for example, antennas 252, demodulators 254, receive processor 258, and/or the like, and may receive, from the identifying module 810 and as data 816, and/or from a BS 850 and as data 818, one or more beams. For example, the reception module 804 may receive information associated with performing one or more measurements to identify a beam for communication with the BS 850. In some aspects, the reception module 804 may receive the one or more beams prior to a wake cycle associated with a CDRX mode of the apparatus 802. In some aspects, the reception module 804 may receive information associated with receiving a control channel or a data channel using a selected beam. For example, based at least in part on the identifying module 810 identifying a beam based at least in part on one or more measurements of one or more beams, the apparatus 802 may select the beam to receive the control channel or the data channel, and the reception module 804 may receive the control channel or the data channel using the beam. Additionally, or alternatively, the reception module 804 may receive configuration information, such as information identifying a quantity of measurements to perform, information indicating whether to suppress transmission of a measurement report, and/or the like. Additionally, or alternatively, the reception module 804 may receive network traffic, such as based at least in part on the BS 850 determining that network traffic is to be transmitted to the apparatus 802.

The determining module 806 may include, for example, receive processor 258, controller/processor 280, and/or the like, and may receive from reception module 804 and as data 820, information associated with determining an occurrence of a triggering event. For example, the determining module 806 may determine an occurrence of a triggering event relating to a reception mode state, such as whether the apparatus 802 is operating in a CDRX mode. In this case, the determining module 806 may determine to report a subset of possible triggering events for triggering beam switches to reduce a quantity of beam switches during the CDRX mode. In some aspects, an occurrence of a triggering event may relate to an RRC state, such as an RRC connected state for a CDRX mode. In some aspects, the determining module 806 may determine an occurrence of a triggering event relating to a reference beam (e.g., a reference beam that is quasi-colocated with an active beam). For example, when a characteristic of the reference beam does not satisfy a threshold criterion (e.g., a reference beam signal strength is less than a threshold signal strength), the determining module 806 may determine to trigger beam recovery. In some aspects, the criterion may be a filtering criterion, a hysteresis criterion (e.g., a threshold criterion with a delta value to reduce a likelihood of incorrectly triggering beam recovery), and/or the like.

The performing module 808 may include, for example, receive processor 258, controller/processor 280, and/or the like, and may receive, from the determining module 806 and as data 822, and/or from the reception module 804 and as data 824, information associated with one or more beams to perform one or more measurements. For example, the performing module 808 may perform one or more measurements of one or more beams, of a plurality of beams that the apparatus 802 is configured to use for communication, to identify a beam to use for communication with the BS 850. In some aspects, the performing module 808 may perform a particular quantity of measurements. For example, based at least in part on configuration information received from the BS 850, the performing module 808 may determine to perform the quantity of measurements, a minimum quantity of measurements, a maximum quantity of measurements, and/or the like.

The identifying module 810 may include, for example, controller/processor 280 and/or the like, and may receive, as data 826, and from the performing module 808, information associated with identifying a beam to use for communication with BS 850. For example, the identifying module 810 may receive information identifying one or more measurements of one or more beams, and may identify a beam, of the one or more beams, to use for communication with the BS 850 (e.g., to receive a control channel or a data channel) based at least in part on the one or more measurements. In some aspects, the identifying module 810 may generate a measurement report. For example, the identifying module 810 may generate a measurement report for transmission to the BS 850 by the transmission module 812 to indicate a beam switch to a beam for communication. Additionally, or alternatively, the identifying module 810 may suppress a measurement report. For example, based at least in part on an occurrence of a triggering event relating to reducing a quantity of beam switches to conserve power resources of the apparatus 802, the identifying module 810 may suppress the measurement report and suppress a beam switch.

The transmission module 812 may include, for example, transmit processor 264, modulators 254, antennas 252, and/or the like, and may receive, from the identifying module 810 and as data 828, information for transmission to the BS 850. For example, the transmission module 812 may receive information identifying a measurement report to transmit to the BS 850 to trigger a beam switch to a beam for communication. Additionally, or alternatively, the transmission module 812 may receive information associate with a scheduling request, a reference signal request, an indicator of a grant, an acknowledgement message, uplink control information, a grantless uplink transmission, and/or the like. The transmission module 812 may provide, to the BS 850 and as data 830, information, such as a measurement report, an identifier of a beam for communication, a scheduling request, a reference signal request, an indicator of a grant, an acknowledgement message, uplink control information, a grantless uplink transmission, and/or the like.

The apparatus may include additional modules that perform each of the blocks of the algorithm in the aforementioned flow chart of FIG. 6. As such, each block in the aforementioned flow chart of FIG. 6 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
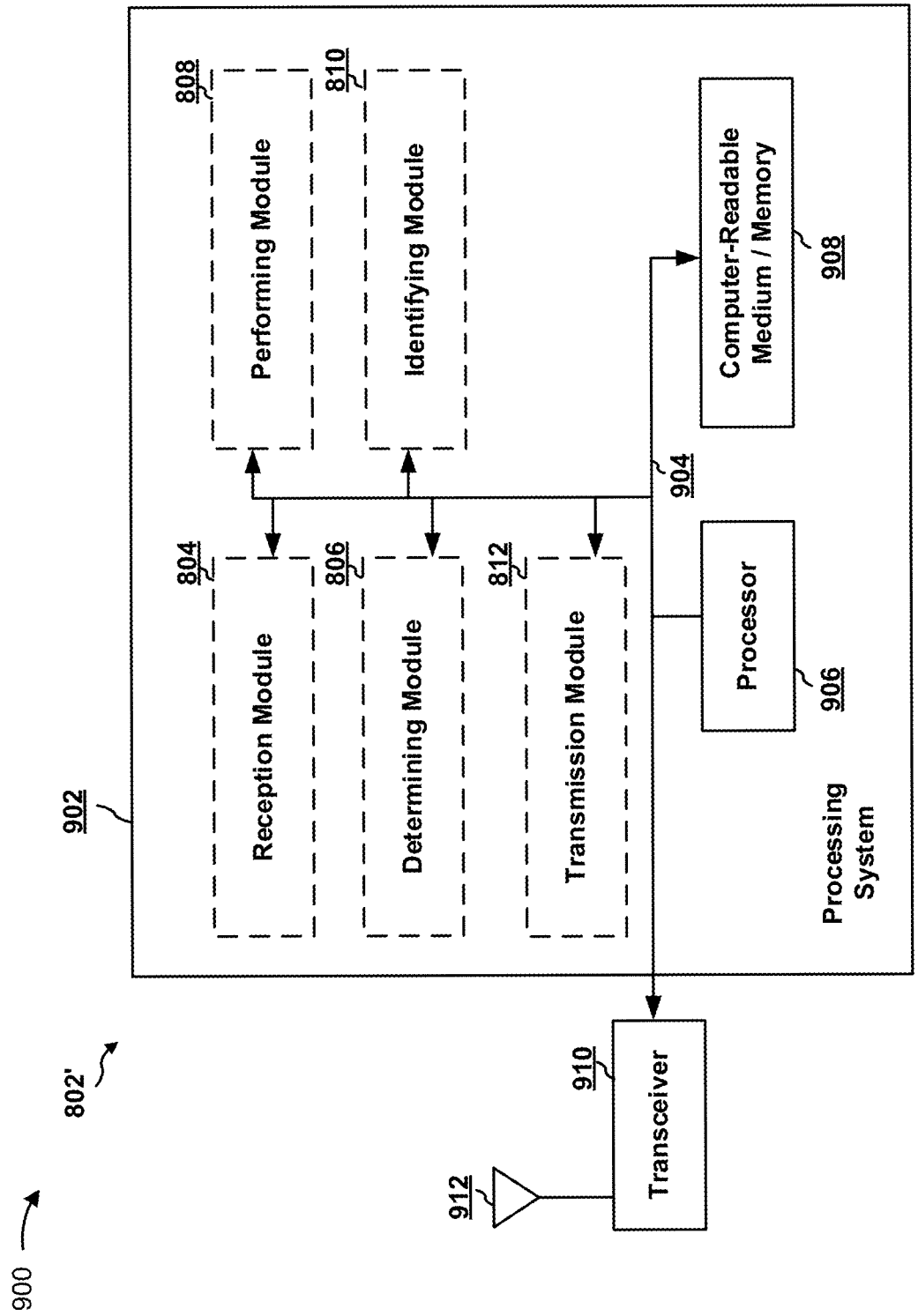
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a UE.

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, 810, 812 and the computer-readable medium/memory 908. The bus 904 may also link various other circuits such as timing sources, peripherals, voltage regulators, and power management circuits, which are well known in the art, and therefore, will not be described any further.

The processing system 902 may be coupled to a transceiver 910. The transceiver 910 is coupled to one or more antennas 912. The transceiver 910 provides a means for communicating with various other apparatus over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 812, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described supra for any particular apparatus. The computer-readable medium/memory 908 may also be used for storing data that is manipulated by the processor 906 when executing software. The processing system further includes at least one of the modules 804, 806, 808, 810, and 812. The modules may be software modules running in the processor 906, resident/stored in the computer readable medium/memory 908, one or more hardware modules coupled to the processor 906, or some combination thereof. The processing system 902 may be a component of the UE 120 and may include the memory 282 and/or at least one of the receive processor 258, the transmit processor 264, and/or the controller/processor 280.

In some aspects, the apparatus 802/802' for wireless communication includes means for determining an occurrence of a triggering event relating to identifying a beam of a plurality of beams. In some aspects, the apparatus 802/802' includes means for performing measurements of reference signals on different beams, of the plurality of beams, prior to a wake cycle associated with a reception mode of the apparatus 802/802' based at least in part on detecting the occurrence of a triggering event. In some aspects, the apparatus 802/802' includes means for identifying, based at least in part on the measurements, the beam. In some aspects, the apparatus 802/802' includes means for receiving a control channel or a data channel using the beam based at least in part on identifying the beam. The aforementioned means may be one or more of the aforementioned modules of the apparatus 802 and/or the processing system 902 of the apparatus 802' configured to perform the functions recited by the aforementioned means. As described supra, the processing system 902 may the receive processor 258, the transmit processor 264, and/or the controller/processor 280. As such, in one configuration, the aforementioned means may be the receive processor 258, the transmit processor 264, and/or the controller/processor 280 configured to perform the functions recited by the aforementioned means.

FIG. 9 is provided as an example. Other examples are possible and may differ from what was described in connection with FIG. 9.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication at a user equipment (UE) for performing a beam identification process, comprising:
    determining, by the UE, an occurrence of a triggering event, wherein the triggering event is associated with an identification of a beam of a plurality of beams;
    performing, by the UE, measurements of reference signals on different beams, of the plurality of beams, prior to a wake cycle associated with a reception mode of the UE, wherein the UE is configured to wake, based on the occurrence of the triggering event, from a sleep cycle to perform the measurements before an 'ON' period of the wake cycle;
    identifying, by the UE, the beam based at least in part on the measurements; and
    receiving, by the UE, a control channel or a data channel using the beam after identifying the beam.

2. The method of claim 1, wherein the reference signals are transmitted by a base station and include at least one of:
    a synchronization signal,
    a channel state information reference signal (CSI-RS), or
    a combination thereof.

3. The method of claim 2, wherein at least one of the reference signals is the CSI-RS; and
    wherein the CSI-RS corresponds to the user equipment or a cell that includes the user equipment.

4. The method of claim 1, further comprising transmitting a scheduling request, to a base station, that indicates the beam using a network resource allocated for beam recovery.

5. The method of claim 1, wherein a network resource allocated for beam recovery to identify the beam is to be used to:
send a measurement report,
receive an indication of the beam, or
send a request for a reference signal of the reference signals.

6. The method of claim 1, further comprising:
receiving information that identifies at least one of:
a quantity of the measurements,
a minimum quantity for the quantity of the measurements, or
a maximum quantity for the quantity of the measurements.

7. The method of claim 1, wherein the reference signals are selected for the measurements based at least in part on a periodicity of the reference signals.

8. The method of claim 1, wherein the measurements are performed prior to a scheduling request or a beam recovery request associated with identifying the beam.

9. The method of claim 1, wherein the UE is configured to identify the beam to avoid a beam switch to another beam of the plurality of beams.

10. The method of claim 1, wherein the triggering event corresponds to a reception mode state.

11. The method of claim 1, wherein the triggering event corresponds to a criterion associated with a battery of the UE or a quantity of beam switches, and wherein the criterion is at least one of:
a filtering criterion, or
a threshold criterion.

12. The method of claim 1, wherein the UE is configured to suppress a condition report when the triggering event occurs.

13. The method of claim 1, wherein a reference signal, of the reference signals, is quasi co-located with at least one of the different beams; and
wherein the triggering event relates to a threshold power level for the at least one of the different beams.

14. The method of claim 1, wherein the occurrence of the triggering event causes the UE to include a measurement report in a scheduling request resource to identify the beam.

15. The method of claim 14, wherein the measurement report identifies a subset of the plurality of beams.

16. The method of claim 14, wherein the UE uses the beam after transmission of the measurement report identifies the beam.

17. The method of claim 14, wherein the UE recovers the control channel or the data channel using the measurement report to receive network traffic before a next scheduled active period of the reception mode and in another reception mode.

18. The method of claim 14, wherein a next active period of the reception mode is suppressed based at least in part on the measurement report.

19. The method of claim 14, wherein the measurement report regarding the measurements and other information are to be provided via a same beam,
the other information including at least one of:
an indicator relating to a grant,
an acknowledgement message,
uplink control information, or
a grantless uplink transmission.

20. A user equipment (UE) for wireless communication, comprising:
memory; and
one or more processors coupled to the memory, the memory and the one or more processors configured to:
determine an occurrence of a triggering event, wherein the triggering event is associated with an identification of a beam of a plurality of beams;
perform measurements of reference signals on different beams, of the plurality of beams, prior to a wake cycle associated with a reception mode of the UE, wherein the UE is configured to wake, based on the occurrence of the triggering event, from a sleep cycle to perform the measurements before an 'ON' period of the wake cycle;
identify the beam based at least in part on the measurements; and
receive a control channel or a data channel using the beam after identifying the beam.

21. The UE of claim 20, wherein the reference signals are transmitted by a base station and include at least one of:
a synchronization signal,
a channel state information reference signal (CSI-RS), or
a combination thereof.

22. The UE of claim 21, wherein at least one of the reference signals is the CSI-RS; and
wherein the CSI-RS corresponds to the user equipment or a cell that includes the user equipment.

23. The UE of claim 20, wherein the one or more processors are further configured to transmit a scheduling request, to a base station, that indicates the beam using a network resource allocated for beam recovery.

24. The user equipment of claim 20, wherein a network resource allocated for beam recovery to identify the beam is to be used to:
send a measurement report,
receive an indication of the beam, or
send a request for a reference signal of the reference signals.

25. The user equipment of claim 20, wherein the one or more processors are further configured to receive information that identifies at least one of:
a quantity of the measurements,
a minimum quantity for the quantity of the measurements, or
a maximum quantity for the quantity of the measurements.

26. The user equipment of claim 20, wherein the reference signals are selected for the measurements based at least in part on a periodicity of the reference signals.

27. An apparatus for wireless communication, comprising:
means for determining an occurrence of a triggering event, wherein the triggering event is associated with an identification of a beam of a plurality of beams;
means for performing measurements of reference signals on different beams, of the plurality of beams, prior to a wake cycle associated with a reception mode of the apparatus, wherein the apparatus is configured to wake, based on the occurrence of the triggering event, from a sleep cycle to perform the measurements before an 'ON' period of the wake cycle;
means for identifying the beam based at least in part on the measurements; and
means for receiving a control channel or a data channel using the beam after identifying the beam.

28. A non-transitory computer-readable medium storing instructions for wireless communication, the instructions comprising:
    one or more instructions that, when executed by one or more processors of a user equipment (UE), cause the one or more processors to:
        determine an occurrence of a triggering event, wherein the triggering event is associated with an identification of a beam of a plurality of beams;
        perform measurements of reference signals on different beams, of the plurality of beams, prior to a wake cycle associated with a reception mode of the UE, wherein the UE is configured to wake, based on the occurrence of the triggering event, from a sleep cycle to perform the measurements before an 'ON' period of the wake cycle;
        identify the beam based at least in part on the measurements; and
        receive a control channel or a data channel using the beam after identifying the beam.

29. The non-transitory computer-readable medium of claim 28, wherein the triggering event corresponds to a criterion associated with a battery of the user equipment or a quantity of beam switches.

30. The non-transitory computer-readable medium of claim 28, wherein a quantity of the measurements is determined based on received information that identifies the quantity of the measurements, a minimum quantity for the quantity of the measurements, or a maximum quantity for the quantity of the measurements, and wherein the information is received from a base station.

\* \* \* \* \*